United States Patent [19]

Aiello

[11] 3,956,520

[45] May 11, 1976

[54] PROCESS FOR MANUFACTURING CHEESE PRODUCT

[76] Inventor: Joseph A. Aiello, 7023 - 16th Ave., Brooklyn, N.Y. 11204

[22] Filed: May 17, 1974

[21] Appl. No.: 471,129

Related U.S. Application Data

[63] Continuation-in-part of Ser. No. 416,432, Nov. 16, 1973, abandoned, which is a continuation-in-part of Ser. No. 368,247, June 8, 1973, abandoned, which is a continuation-in-part of Ser. No. 218,482, Jan. 17, 1972, abandoned.

[52] U.S. Cl. ............................... 426/582; 426/583; 426/491
[51] Int. Cl.$^2$......................................... A23C 21/00
[58] Field of Search ........... 426/185, 188, 356, 358, 426/361, 580, 582, 583, 491

[56] References Cited
UNITED STATES PATENTS

| | | | |
|---|---|---|---|
| 2,507,480 | 5/1950 | McDonald et al. | 426/361 |
| 3,704,136 | 11/1972 | Lavarda | 426/361 |

OTHER PUBLICATIONS

Kosikowski, F., "Cheese and Fermented Milk Foods," Cornell Univ., N.Y., 1966, p. 193.
Sanders, G., "Cheese Varieties and Descriptions," U.S. Dept. of Agr., Handbook No. 54, 1953, pp. 105–106.

*Primary Examiner*—Raymond N. Jones
*Assistant Examiner*—R. A. Yoncoskie
*Attorney, Agent, or Firm*—Clarence A. O'Brien; Harvey B. Jacobson

[57] ABSTRACT

A cheese filler product is produced from cheese whey by heating cheese whey having a titrable acidity of 0.10–0.12 percent to 180°–188°F., acidifying the whey in at least two stages thereby causing fine particulate cheese solids to separate to the surface of the whey, cooking the cheese solids to a moisture content of about 60–70 percent, drying the cheese solids to about 20–30 percent moisture with continuous agitation, salting and grating the cheese solids.

19 Claims, No Drawings

PROCESS FOR MANUFACTURING CHEESE PRODUCT

CROSS-REFERENCE TO RELATED APPLICATIONS

This application is a continuation-in-part of application Ser. No. 416,432, filed Nov. 16, 1973, now abandoned, which was a continuation-in-part of Ser. No. 368,247, filed June 8, 1973, now abandoned, which was a continuation-in-part of Ser. No. 218,482, filed Jan. 17, 1972, now abandoned.

BACKGROUND OF THE INVENTION

1. Field of the Invention

This invention relates to the manufacture of cheese byproducts suitable for human consumption. This invention further relates to a method for processing cheese whey to produce a very low moisture content, inexpensive cheese filler which can be mixed with other cheeses.

2. Description of the Prior Art

The whey byproducts produced in the normal processing or manufacture of cheese are known to contain quantities of useful fats and proteins. Prior to this time, a number of processes have been developed to produce products suitable for both human and animal consumption by removing these fats and proteins from the whey byproducts before they are discarded.

In a number of well known processes a Ricotta cheese product is made by salting, heating and acidifying fresh whey in a cheese vat, skimming the floating precipitated cheese solids and drying the solids. However, cheese products made in this fashion are generally high moisture content cheese products not suitable for grating and/or use as a cheese filler. Even prolonged drying of these products, to the point of spoilage, results in products having moisture contents too high for use as a grated cheese filler product. While of course the moisture content can eventually be reduced to a suitable level, this level is only reached after spoilage and wastage of at least a portion of the cheese product.

For example, Sanders, *Cheese Varieties and Descriptions*, U.S. Department of Agriculture Handbook No. 54, 1953 teaches a process for making a Ricotta cheese product from 0.20% acidity whey by heating the whey to 200°F., adding sour whey or other coagulant and removing the floating precipitated coagulated albumin by dipping with a perforated ladle or dipping cloth. After draining and/or pressing in cheesecloth lined hoops the product may be marketed as "fresh or moist Ricotta" having a moisture content of 68 to 73 percent. If the product is to be marketed as "dry Ricotta," the curd is further dried by pressing in perforated forms and drying in a curing room at 100°F. or higher. This dry Ricotta has a moisture content of 60% which is more than twice as high as is suitable for a grated cheese filler product. If any effort is made to continue the drying to a low enough moisture content for a grated cheese product, the curd would spoil before an acceptable moisture content could be reached. The fact that this cheese product has such a high moisture content inherently results from the method of its manufacture which produces large curd particles entraining considerable moisture.

In still another example, Kosikowski, *Cheese and Fermented Milk Foods*, Cornell University, 1966, teaches that whole milk Ricotta cheese may be made by acidifying whole milk to pH 5.9–6.0, heating the milk to about 176°F. to precipitate and coalesce the curd and recovering the curd by dipping. Any curd not precipitated by the initial acidification may be coagulated by subsequent acid additions. The resulting cheese product is "characterized by a high moisture content very similar to creamed cottage cheese"— i.e., a moisture content in excess of about 72%. This high moisture content is attributable to the precipitating of the curd whereby large curd particles are formed notwithstanding that fine curd flakes initiate the precipitation. The particle size is in part caused by the effort to effect total curd precipitation by a single massive acid addition. However, as a practical matter, not all of the curd will precipitate at once and therefore subsequent small acid additions are employed to coagulate the remaining curd.

Dry Ricotta, suitable for grating, may be made from high moisture cheese by pressing the curd into molds for 24 hours at room temperature and curing the cheese for several months at 50°–60°F. or for 4 weeks at 70°F. However, during this curing period spoilage occurs and it is necessary to clean the cheese surface from time to time and to discard the spoiled waste.

Other processes are known for manufacturing byproducts from cheese whey. For example, U.S. Pat. No. 3,252,961 to Rodgers et al., describes a process for recovering proteins from whey in which an anionic polyelectrolyte flocculating agent is added to a whey solution containing a whey protein precipitate. The product produced by this process is whey protein curd having a quasicrystalline structure. While this product has a high content of protein, it cannot be directly used as a human foodstuff, because such cheese-whey-byproducts do not have a particularly pleasing flavor or aroma.

SUMMARY OF THE INVENTION

It is therefore an object of the present invention to provide a process for manufacturing a firm cheese filler product from cheese whey which product exhibits a low (less than about 30%) moisture content.

It is another object of this invention to provide a process for manufacturing a low moisture content, fine cheese product suitable for grating wherein the curd from whey precipitates in fine particle form as a result of staged acid additions.

It is still another object of this invention to provide a process for manufacturing a low moisture content cheese product from cheese whey wherein the low moisture content may be achieved in commercially practical periods of time without prolonged storing or curing and without spoilage of any portion of the precipitated curd.

It is yet another object of this invention to provide a process for manufacturing from cheese whey a cheese product suitable for grating characterized by increased yield and low moisture content, which process carefully controls the acidity and precipitation temperature of the whey.

Other objects and advantages will become apparent from the following description and appended claims.

Briefly stated, in accordance with the aforesaid objects, cheese whey is treated with a base to adjust its acidity to within proper limits. Next, the whey composition is heated to an elevated temperature and an acid is added in stages to cause fine particulate cheese solids to separate to the surface of the whey. The cheese solids at the surface of the whey composition are then cooked until the moisture content of the cheese solids is 60 to 70 percent. The cooked cheese solids are further heated using low pressure steam to reduce the moisture content to the range 20–30%, after which the dried cheese solids are salted and grated to produce a cheese filler product having a low moisture content. The cheese filler products thus produced can be directly added to other cheese to produce cheese compositions having pleasing flavors which are suitable for human consumption.

DETAILED DESCRIPTION OF THE INVENTION

In carrying out the process for making cheese filler according to this invention, fresh whey is first filled into a cheese vat. The cheese whey useful in this invention can be obtained from the manufacture of any kind of cheese. For example, whey from the manufacture of Swiss cheese, American cheese, cheddar cheese, mozzarella cheese or munster cheese can be used.

After the cheese whey has been placed in the cheese vat, salt, usually consisting of sodium chloride or any other physiologically compatible salt, is preferably added. As is well known, salt is added to the whey composition to prevent spoilage of the subsequent cheese product and for flavoring purposes. Thus, while it is not essential to add salt precisely at this time, salt is preferably added before further processing to prevent spoilage or other chemical breakdown of the cheese during subsequent process steps. The amount of salt added can vary anywhere from one to one and a half pounds of salt per 1,000 pounds of whey, preferably about one pound of salt per 1,000 pounds of whey.

A neutralizer is then added to the whey cheese composition to reduce its acidity. The amount of neutralizer added should be sufficient to bring the titrable acidity of the composition to the range 0.10–0.12, preferably about 0.11 percent, although, if the composition already has a titrable acidity within this range, no neutralizer need be added. As is well known, titrable acidity is a measure of the total acid content of a composition. This is distinct from pH, which is a measure of the hydrogen ion concentration of a solution. As is appreciated in the cheese-making art, observance of titrable acidity in cheese-making processes can lead to different results than observance of pH. In the process of this invention it has been found that observance of titrable acidity provides more accurate control of the separation of cheese solids from the whey than observance of the pH. Specifically, it has been found that controlling the titrable acidity to within the specified range is critical since greater acidity leads to additional moisture in the precipitated curd and is uneconomical while less acidity adversely affects yield.

The neutralizers which may be used in the process of this invention are well-known in the cheese-making art. These neutralizers are bases which are suitable for human consumption. For example, sodium hydroxide or potassium hydroxide can be used. In addition, a substance known as Nuflow, which is manufactured by Wyandotte Chemical Company and which is a crystalline compound containing sodium carbonate, sodium bicarbonate and water referred to as sodium sesquicarbonate has been found to be a particularly effective neutralizer.

The whey composition is next heated and uniformly mixed in the cheese vat. It is very important that this heating step not be undertaken until after the composition is neutralized to an acidity of about 0.10–0.12 percent. Otherwise, cheese solids in the form of heavy precipitates will sink to the bottom of the cheese vat and the whey composition will thus be unsuitable for use in the process of this invention. Heating continues until the temperature of the whey has reached 180°–188°F., preferably about 182°F., at which time the heat is adjusted to maintain the composition at this temperature. Since precipitation at temperatures above 188°F. have been found to adversely affect yield, and since it has been found that after each stage of acid addition and precipitation the whey temperature increases about 2°–3°F., it is very desirable to maintain the whey temperature at the low end of the 180°–188°F. temperature range prior to the first stage of acid addition. This will insure that all precipitation takes place in the 180°–188°F. temperature range. If the temperature is permitted to drop below this range during precipitation, the precipitated cheese solids will sink to the bottom of the vat irrespective of the fineness of the cheese flake. It will be appreciated that subsequent cooking of the precipitated cheese solids to reduce their moisture content, which is a critical step in the process, can only be accomplished when fine cheese flake particles accumulate at the top of the whey composition.

The whey composition is then acidified in at least two stages to cause the cheese solids in the whey to separate out and float to the surface of the whey composition. This acidification is accomplished by adding an acid substance to the whey composition so that the titrable acidity of the whey increases to about 1.35 to 1.55 percent, preferably about 1.40 to 1.50 percent. Care must be taken when the acid is added so that the cheese solids which separate out float to the surface of the whey composition. For example, if the acid substance is added too quickly, the cheese solids form lumpy preciptiates which sink to the bottom of the vat and are thus unusable in the process of this invention. Preferably, the acid substance is added in three stages, and the amount of acid added in each stage is adjusted so that cheese flakes approximately the size of medium-sized snow flakes form when the acid in each stage is added. Unless the cheese precipitate particle size is controlled to sizes of medium-sized snow flakes or smaller, a product having the requisite dryness and firmness cannot be produced. Acid additions to the whey should be no more frequent than every five minutes in order that all the precipitation caused by each acid addition can occur before more acid is added to the whey. When the whey clears all precipitation has occurred and the next acid addition can be made.

The acids that can be used to adjust the acidity of the whey in the process of this invention are any acids which are suitable for human consumption. These acids are well-known in the cheese-making art. For example, citric acid, white vinegar or hydrochloric acids can be used. Also, "whey starter," which is whey having a high acidity and "milk starter" which is milk having a high acidity can be used.

After the acid substance has been added and the cheese solids in the form of medium-size cheese flakes or smaller have floated to the surface of the whey composition, a layer of cheese solids approximately two to three inches thick forms on the surface of the whey composition. This layer of cheese solids is allowed to remain on the surface of the whey composition while heating is continued, so that the cheese solids are cooked.

It has been found that if the layer of cheese solids is left undisturbed during the cooking step, soft spots will usually develop in the cheese solids are masticated during the cooking step to promote unifrom cooking. This can be done by chopping the cheese solids with a dipper or by any other suitable means well known in the cheese making art.

It is also preferable to form a thicker layer of the cheese solids on the surface of the whey composition. This can be done by skimming the cheese solids from a large portion of the surface area to a small portion of the surface area of the whey composition. The thicker layer of cheese solids thus formed can then be masticated again so that it cooks firmly and uniformly.

Cooking of the layer of cheese solids is continued until its moisture content decreases to 70 percent or lower, preferably to 60 percent, the attainable moisture content resulting from cooking depending to a large extent on the number of acid addition stages utilized. For example, if two acid addition stages are employed, it is difficult to reduce the moisture content by cooking for a commercially reasonable period much below about 66percent. However, if three or more acid addition stages are employed, there is no difficulty in attaining a 60 percent moisture content in the cooked cheese solids. Following moisture content reduction to 60–70 percent by cooking the solids layer at the surface of the whey, the cheese solids may be removed from the cheese pan and dipped into cheesecloths or other suitable means to drain and cool. Alternatively, the cheese curd solids may be separated from the waste whey by permitting the whey to drain from the vat through a bottom drain line.

The cheese solids are next placed in a vat or container where they can be subjected to indirect heating with pressurized steam. Generally the cheese vat in which the precipitation tool place is not designed to accept pressurized steam as a heating medium and the cheese solids will usually have to be moved to a suitable jacketed container. Of course, if the original cheese vat can accept pressurized steam it is that much more desirable, in which case the whey is drained from the vat before pressurized steam heating is commenced. Low pressure steam, up to 30 psig, is the preferred heating medium. If the steam pressure is higher the steam temperature is too high to allow sufficient control of the moisture reduction process and the cheese can be damaged. If the steam is not pressurized to at least 10 psig, then moisture content reduction to 20–30 percent, the final desired moisture content, cannot be accomplished in a single step in a reasonable period of time. Within this range the steam pressures suitable for use from the standpoint of process control and avoiding damage to the cheese depend upon the moisture content of the cheese solids. For example, pressures approaching 30 psig may be used initially while the moisture content remains near 60 percent. However, as the cheese solids dry, the suitable steam pressure range is considerably lowered. It is, therefore, recommended that a constant steam pressure be used throughout drying of about 10 psig. At this pressure, drying can be accomplished from 60–70 percent moisture to 20–+percent moisture in less than 5 hours, usually 4–5 hours.

Heating with the steam at temperatures in the range 175°–215°F., preferably 210°–215°F., with constant mechanical agitation, should be continued until the moisture content of the cheese solids decreases to 20–30 percent, and preferably to about 25 percent. Agitation may be accomplished in any well known manner, such as by use of a fork agitator or equivalent mechanical agitator.

The cheese solids may be salted prior to or following drying so that the ultimate cheese filler product of this invention will have a salt content of about 3 to 6 percent, preferably 4 to 5 percent. As is set forth above, salt is added to cheese products to prevent spoilage and as a flavor enhancer. Thus, salt is added to bring the salt content of the cheese filler product to the required level. However, it should be understood that the salt may be added anytime during the manufacture of the cheese filler product so long as the amount of salt in the ultimate product is maintained between about 3 to 6 percent. The salt may be added to the cheese solids by any conventional salting technique.

After grating the 20–30 percent, preferably about 25 percent, moisture containing cheese product, the ultimate cheese filler product of this invention has been completed. The cheese filler product of this invention has a soft texture and an appearance similar to other finely grated cheeses. This cheese filler product is suitable for human consumption and can be directly mixed with other cheeses, such as parmesan cheese, sbrinze cheese, romano cheese and provoloni cheese, to extend the mass of these cheeses without affecting their pleasing flavors. Since the different cheese-whey starting materials useful in the process of this invention have somewhat different compositions, the composition and texture of the cheese filler product of this invention varies slightly depending on the type of whey used. However, it has been found that regardless of the type of whey used, the cheese filler produced according to this invention can be directly incorporated with various cheeses to extend them in the manner set forth above.

Since it is a principal object of this invention to produce a low moisture content cheese suitable for grating it will be appreciated that rapid moisture content reduction is a critical aspect of the process. If conventional drying techniques are used, vast storage facilities are necessary and many days are wasted before the finished product is completed and ready for sale. According to the present process, the cheese can be completely manufactured and on the market in less than 24 hours. In addition, equipment costs are minimized and the need for skilled equipment operators is obviated. It should be recognized, however, that an alternative drying technique useful in this invention contemplates reducing the cheese solids moisture content to the range 40–50 percent by heating using hot water or steam in the range 175°–215°F., grating the cheese and then further drying the cheese to the desired 20–30 percent range using conventional, commercially available equipment, such as a fluid bed dryer marketed by The Fitzpatrick Company. However, it should be understood that this alternative technique, although producing the same dry cheese product in a commercially reasonable period of time, is not nearly as desirable as the preferred pressurized steam technique of the process herein described. This is because by using the alternative technique the moisture content reduction from 60–70 percent to 20–30 percent requires two steps and because the suitable commercially available dryers for the final moisture content reduction are expensive and require skilled operators. As a result the economics of the alternative technique are not favorable.

While the invention has been completely described above, the following example is provided for a better understanding of the nature of this invention.

EXAMPLE 1

10,000 pounds of fresh whey from the manufacture of mozzarella cheese is filled into a rectangular cheese vat equipped with an impeller in the form of a long pipe. The pipe impeller is positioned parallel to the floor of the vat and is adapted so that it rotates in a plane parallel to the plane of the vat floor. The pipe impeller is internally connected to a supply of steam and is provided longitudinally with a number of holes so that steam from the steam source flows out of the impeller pipe in a horizontal direction.

To the fresh whey composition in the cheese vat approximately 10 pounds of salt, are added. At this point, the titrable acidity of the cheese whey composition is approximately 15 to 18 percent, and 4 pounds of Nuflow are added.

Steam from the steam source is turned on and the impeller is caused to rotate so that the cheese whey composition is uniformly heated to a temperature of 182°F. Upon reaching this temperature, the steam flow rate is reduced so that the composition remains at this temperature.

Approximately 12 ounces of citric acid are diluted in 8 gallons of fresh water and are then added to the whey composition. As a result, cheese flakes approximately the size of medium-sized snow flakes separate out from the whey composition and float to the surface of the vat. After at least 5 minutes have passed to allow all precipitation possible from the first acid addition, an additional 12 ounces of citric acid diluted in 8 gallons of water are then added to the whey composition (which now has a temperature of about 184°–185°F.) causing more cheese flakes of approximately the same size to separate out from the whey composition and float to the surface. After about another 5 minutes of precipitation 12 ounces more of citric acid are diluted in 8 gallons of fresh water and again added to the whey composition (now at a temperature of about 187°–188°F.) causing a small additional amount of cheese flakes to separate to the surface of the vat. After this third addition of acid to the whey composition, the titrable acidity of the whey composition is approximately 1.45 percent, and a layer of cheese solids approximately three inches thick and weighing 350 pounds is formed on the surface of the whey composition.

Heating is continued in order to cook the layer of cheese solids floating on the surface of the vat at approximately 190°F. During cooking, the layer of cheese solids is intermittently chopped in its soft spots with a dipper to promote uniform cooking. After about 20 minutes, the mass of cheese solids is slowly moved to the front half of the cheese vat by skimming to form a thicker layer of cheese solids having a thickness of approximately five inches. This thicker layer of cheese solids is also chopped in its soft sopts with the dipper to ensure uniform cooking. Cooking of the cheese solids continues until the thicker layer of cheese solids has a moisture content of approximately 60 percent (about one-fourth hour).

The cheese solids are next removed from the cheese vat and placed into cheesecloths to drain and cool. After the cheese solids are drained they are placed in a jacketed vat and salt is added to bring the salt content up to about 3–6 percent. The cheese solids are agitated with a fork agitator and steam at a pressure of about 10 psig is fed through the jacket to uniformly heat the solids. Heating is continued for about 4–4 ½ hours at which point the moisture content of the solids in the vat is about 25 percent.

The cheese solids are removed from the vat and grated. The product is then sifted through a fine stainless steel mesh screen to produce 160 pounds of the ultimate cheese filler product of this invention.

160 pounds of this cheese filler product are mixed with 40 pounds of grated parmesan cheese to produce a composition having a pleasing flavor substantially the same as grated parmesan cheese.

EXAMPLE 2

Example 1 was repeated except that the product was mixed with grated romano cheese. The resultant composition had a texture and flavor substantially the same as grated romano cheese.

EXAMPLE 3

Example 1 was repeated except that cheese whey from the manufacture of provoloni cheese was used as the starting material, and the cheese filler product obtained was mixed with grated romano cheese. The resultant composition had a flavor and texture substantially the same as grated romano cheese.

EXAMPLE 4

Example 3 was repeated except the cheese filler product was mixed with grated parmesan cheese. The resultant composition has a flavor and texture substantially the same as grated parmesan cheese.

EXAMPLE 5

Example 1 was repeated except that cheese whey from the manufacture of romano cheese was used as the starting material and the product obtained was mixed with grated parmesan cheese. The resultant product had a texture and flavor substantially the same as grated parmesan cheese.

EXAMPLE 6

The process of Example 1 was repeated except that the citric acid was added in only two steps. Initially 18 ounces of citric acid was diluted in 8 gallons of water and added to the whey composition. After at least 5 minutes, an additional 18 ounces of citric acid diluted in 8 gallons of water was added to the whey composition. The cheese solids layer which formed at the top of the whey composition was heated in the same manner as in Example 1 except that cooking for a similar period of time reduced the moisture content of the cheese solids to only about 66 percent. All subsequent treatment of the cheese solids was the same as in Example 1. However it required a full 5 hours of low pressure steam heating to achieve a final cheese moisture content of 25 percent.

While the present invention has been described with reference to particular embodiments thereof, it will be understood that numerous modifications can be made by those skilled in the art without actually departing from the scope of the invention. Accordingly, all modifications and equivalents may be resorted to which fall within the scope of the invention as claimed.

What is claimed as new is as follows:

1. A process for making a cheese byproduct suitable for human consumption comprising neutralizing cheese whey to a titrable acidity of 0.10–0.12 percent, heating the resultant whey composition to a temperature of 180°–188°F., adding an acid substance to the whey composition in at least two steps while maintaining said whey composition in the temperature range 180°–188°F. so that cheese solids in the form of fine cheese flakes separate to the surface of the whey composition, said acid addition steps being spaced at at least 5 minute intervals, the amount of acid being sufficient so that the titrable acidity of the composition is about 1.35 to 1.55 percent, heating the cheese solids at the surface of the whey composition until the moisture content of said cheese solids is about 60–70 percent, drying said 60 70 percent moisture containing cheese solids to a moisture content of 20–30 percent and grating the dried cheese solids.

2. A process, as claimed in claim 1, including the step of salting said cheese solids to a salt content of 3 to 6 weight percent.

3. A process as claimed in claim 2, wherein 0.1 to 0.15 weight percent salt is added to the cheese whey before neutralization.

4. A process as claimed in claim 1 wherein the whey composition is heated prior to acid addition to about 182°F.

5. A process as claimed in claim 1 wherein said whey composition temperature increases about 2°–3°F. following each acid addition step.

6. A process as claimed in claim 1 wherein the whey composition is neutralized to a titrable acidity of 0.11 percent.

7. A process as claimed in claim 1 wherein said acid substance is added in three steps.

8. A process as claimed in claim 7 wherein said whey composition temperature is about 182°F. at the first acid addition, about 184°–185°F. at the second acid addition, and about 186°–187°F. at the third acid addition.

9. A process for making a cheese byproduct suitable for human comsumption comprising neutralizing cheese whey to a titrable acidity of 0.10–0.12 percent, heating the resultant whey composition to a temperature of 180°–188°F., adding an acid substance to the whey composition in at least two steps while maintaining said whey composition in the temperature range 180°–188°F. so that cheese solids in the form of fine cheese flakes separate to the surface of the whey composition, said acid addition steps being spaced at at least 5 minute intervals, the amount of acid being sufficient so that the titrable acidity of the composition is about 1.35 to 1.55 percent, heating the cheese solids at the surface of the whey composition until the moisture content of said cheese solids is about 60–70 percent, drying said 60–70 percent moisture containing cheese solids to a moisture content of 20–30 percent and grating the dried cheese solids, said step of drying said cheese solids to a moisture content in the range 20 to 30 percent comprising heating said cheese solids to 175°–215°F. with 10 to 30 psig steam and with constant mechanical agitation for a time sufficient to dry said solids to a moisture content of 20–30 percent.

10. A process, as claimed in claim 9, wherein said cheese solids are heated by said steam to a temperature of from 210°–215°F.

11. A process as claimed in claim 9 wherein said steam pressure is about 10 psig.

12. A process as claimed in claim 9 wherein said time is about 4–5 hours.

13. A process as claimed in claim 9 including the step of salting said cheese solids to a salt content of 3 to 6 weight percent.

14. A process as claimed in claim 9 wherein said whey composition temperature increases about 2°–3°F. following each acid addition step.

15. A process as claimed in claim 9 wherein said acid substance is added in three steps.

16. A process for making a cheese byproduct suitable for human consumption comprising neutralizing cheese whey to a titrable acidity of 0.10–0.12 percent, heating the resultant whey composition to a temperature of 180°–188°F., adding an acid substance to the whey composition in three steps while maintaining said whey composition in the temperature range 180°–188°F. so that cheese solids in the form of fine cheese flakes separate to the surface of the whey composition, said acid addition steps being spaced at at least 5 minute intervals, the amount of acid being sufficient so that the titrable acidity of the composition is about 1.35 to 1.55 percent, heating the cheese solids at the surface of the whey composition until the moisture content of said cheese solids is about 60–70 percent, heating said 60–70 percent moisture containing cheese solids to 175°–215°F. with 10 to 30 psig steam and with constant mechanical agitation for a time sufficient to dry said solids to a moisture content of 20–30 percent and grating the dried cheese solids.

17. A process as claimed in claim 16 wherein said steam pressure is about 10 psig and said time is about 4 to 5 hours.

18. A process as claimed in claim 17 including the step of salting said cheese solids to a salt content of 3 to 6 weight percent.

19. A process, as claimed in claim 16, wherein said cheese solids are heated by said steam to a temperature of from 210°–215°F.

* * * * *